United States Patent [19]
Godawski

[11] Patent Number: 5,138,545
[45] Date of Patent: Aug. 11, 1992

[54] HYBRID HIGH VOLTAGE TRANSFORMER

[75] Inventor: Theodore J. Godawski, Des Plaines, Ill.

[73] Assignee: Zenith Electronics Corporation, Glenview, Ill.

[21] Appl. No.: 683,226

[22] Filed: Apr. 10, 1991

[51] Int. Cl.$^5$ .................. H02M 7/06; H01F 27/40
[52] U.S. Cl. .................. 363/68; 336/170; 336/180; 336/208; 336/211; 363/126
[58] Field of Search .......... 363/68, 126; 336/170, 336/199, 200, 211, 180; 315/411

[56] References Cited
U.S. PATENT DOCUMENTS 4,274,136  6/1981  Onodera et al. .............. 363/68
4,967,121 10/1990  Nero .......................... 336/211

FOREIGN PATENT DOCUMENTS 2838174  3/1980  Fed. Rep. of Germany ...... 336/208
97729  8/1979  Japan ............................ 363/68
162667 12/1980  Japan ............................ 336/180
2572  1/1984  Japan ............................ 363/126

Primary Examiner—William H. Beha, Jr.

[57] ABSTRACT

A hybrid high voltage transformer includes three nesting cylindrical coil forms. The inner coil form supports a primary winding and the two outer coil forms support secondary windings that substantially overlie the primary winding. Each of the secondary winding coil forms includes a plurality of circumferential walls forming individual compartments for supporting a multilayered group of coil turns in a substantially uniform pattern over the coil form. The outer coil form includes an upraised central portion to permit tapping of the secondary winding thereon for a DC focus voltage at AC ground. The coil forms include protrusions for supporting connection posts for making electrical connections and supporting electrical components. The two secondary windings are wound in opposite directions.

4 Claims, 3 Drawing Sheets

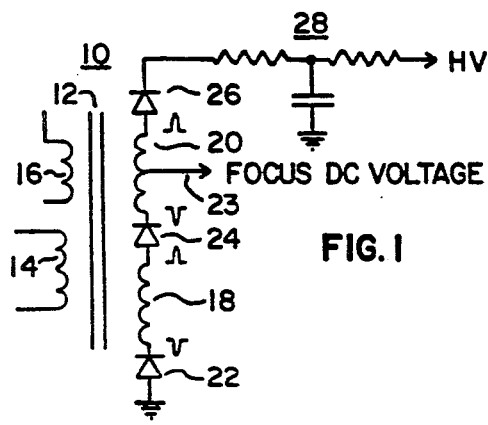
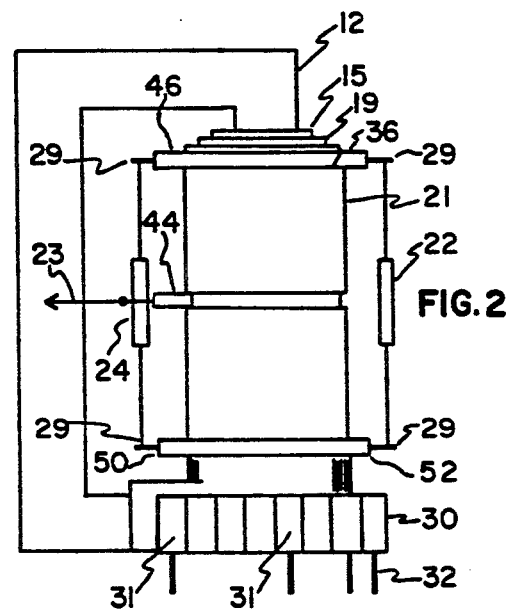
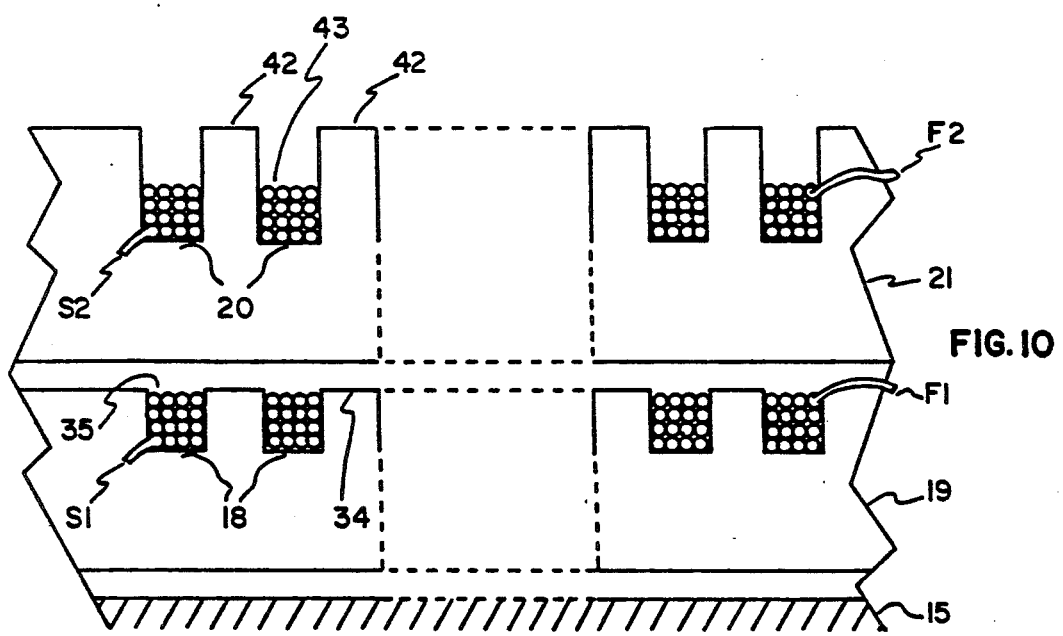

HYBRID HIGH VOLTAGE TRANSFORMER

BACKGROUND OF THE INVENTION AND PRIOR ART

This invention relates generally to pulse type high voltage transformers and specifically to such high voltage transformers for use in television receivers. A color television receiver typically has a high voltage system that develops from 25-33 kilovolts DC for operation of the cathode ray tube. A conventional high voltage transformer includes three or more secondary windings, serially connected with suitable high voltage diodes, that are magnetically linked to a primary winding. The transformer is either a bobbin wound type or a layer wound type. The layer wound transformer is optimum in terms of leakage inductance and distributed capacitance, but suffers the disadvantage of requiring a large number of layers of very fine wire that are separated by layers of insulation from each other and from the primary winding. Such transformers are difficult to manufacture, require a larger number of diodes and connections and are quite expensive. The bobbin wound transformer includes one or more secondary windings that are prewound on bobbins and subsequently mounted on a magnetic core to link with the primary winding. The nature of a bobbin wound secondary is such that many of the coil turns are relatively far from the primary winding, resulting in an undesirably high leakage inductance. The bobbin winding however is much easier to manufacture.

With the present invention, a hybrid transformer is provided which achieves the benefits of both types of transformers. Very specifically, it combines the low leakage and uniformity of a layer wound transformer with the low cost and manufacturability of a bobbin wound transformer.

OBJECTS OF THE INVENTION

A principal object of the invention is to provide an improved high voltage transformer.

Another object of the invention is to provide an economical and efficient high voltage transformer for a color television receiver.

A further object of the invention is to provide a hybrid high voltage transformer having the benefits of a layer wound and a bobbin wound type transformer.

BRIEF DESCRIPTION OF THE DRAWINGS

These and other objects and advantages of the invention will be apparent upon reading the following description in conjunction with the drawings, in which:

FIG. 1 is a simplified schematic diagram of a high voltage transformer with a DC voltage doubling capability;

FIG. 2 is a side view of a portion of a hybrid high voltage transformer constructed in accordance with the invention;

FIG. 10 is a partial cross section indicating the compartmentalization and alignments of the secondary windings in accordance with the invention.

DESCRIPTION OF THE PREFERRED EMBODIMENT

Figure 4:
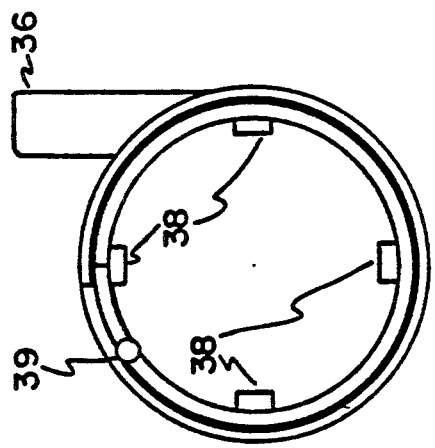
FIGS. 4 and 5 are opposite end views, respectively, of the coil form of FIG. 3.

In FIG. 1, a transformer 10 includes a ferrite core 12 in magnetic relationship to a primary winding 14 and to a pulse winding 16. Pulse winding 16 is optional in many transformers and is not used in the preferred embodiment. In accordance with the invention, two identical secondary windings 18 and 20 are serially connected together and to a ground reference by three high voltage diodes 22, 24 and 26. The cathode of diode 26 is coupled to a filtering network 28 which provides the DC high voltage output. In the arrangement illustrated, the DC output voltage is twice the peak AC voltage; however, other arrangements with different sizes and/or numbers of secondary windings may be used. The invention should therefore not be considered limited to a transformer having two secondaries. It should be understood that the secondary windings in the drawing are wound on coil forms and arranged in accordance with the invention. A tap 23 on secondary winding 20 is taken off for providing a DC focus voltage that is one-half of the high voltage and is at AC ground. Thus the need for filtering of the focus voltage is eliminated.

In FIG. 2, a portion of a hybrid high voltage transformer constructed in accordance with the invention is illustrated. The ferrite core 12 is generally rectangular and, in practice, is formed by two U-shaped pieces which are held together by a clamp or the like. This construction permits insertion of the core through a suitable opening in a cylindrical, plastic primary core form 15 upon which primary winding 14 and pulse winding 16 (if used) may be wound. The innermost primary core form 15 is part of a base 30 which includes a plurality of connection terminal protrusions 31 to which connecting terminals or stakes 32 are attached. This is generally accomplished by insertion of the stakes or pins 32 in suitable apertures formed in the protrusions 31 of base 30. In accordance with the invention, a first secondary winding core form 19 and a second secondary winding core form 21 are cylindrical in shape and arranged to nest with primary core form 15. The secondary winding core forms are also made of an insulating plastic material and formed with terminal receiving protrusions 44, 46, 48, 50 and 52. Suitable connecting stakes or pins 29 are inserted in the terminal receiving protrusions on which diodes 22 and 24 may be supported and electrically connected as illustrated. The general arrangement of nesting plastic core forms and a supporting base with terminal receiving protrusions, is old and is not part of the present invention. It will also be appreciated that the transformer is generally placed in a suitable insulating cup which is filled with an epoxy to make the entire arrangement stable and hermetically sealed.

Figure 3:
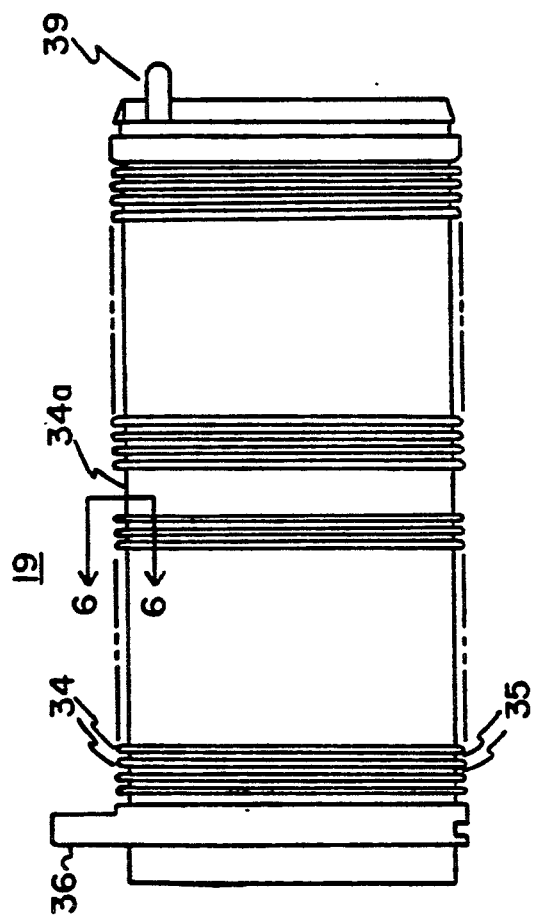
FIG. 3 is a side view of the inner secondary coil form of the invention.
Figure 5:
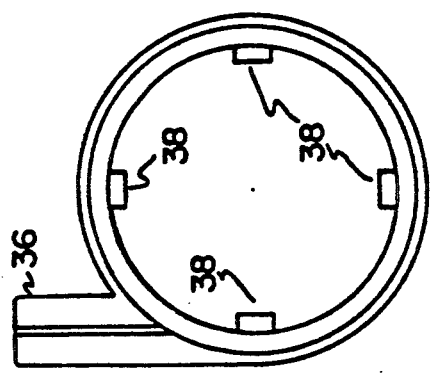

In FIG. 3, taken with FIGS. 4 and 5, the inside secondary core form, that is the core form upon which the first secondary winding is wound, is shown. The core form 19 is cylindrical and includes a plurality of circumferentially spaced walls 34 extending uniformly over its length, with the exception of a small area 34a. The walls 34 define compartments 35 therebetween for supporting multilayered groups of coil turns therein. One end of coil form 19 includes a terminal receiving protrusion 36, which has a slot for frictionally supporting a suitable terminal pin or stake 29 (shown in FIG. 2). The other end of core form 19 includes a small post 38 for securing the end of the secondary coil (by wrapping).

Figure 6:
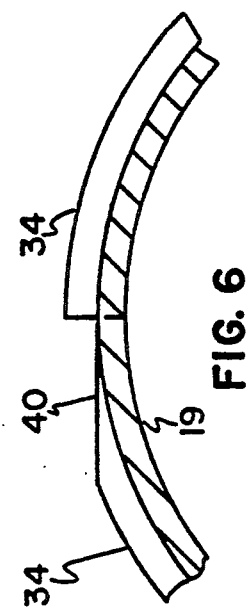
FIG. 6 is a partial section taken along line 6—6 of FIG. 3.

The interior of core form 19 includes four location projections 38. In practice these projections 38 serve as stops for positioning core form 19 on the primary coil form 15. As illustrated in FIG. 6, which is a section taken along the line 6—6 of FIG. 3, each of the walls 34 include an interruption 40 for permitting the secondary winding to transfer to or cross from compartment 35 to the next adjacent compartment 35. With the arrangement shown, the secondary 18 is wound in the compartments 35 using a back-and-forth motion to produce a layered winding in each compartment 35. The walls 34 support the turns of the windings in a bobbin manner. After the correct number of turns have been wound in the first compartment 35, the winding wire is moved to the adjacent compartment via the interruption 40 and a similar number of turns is placed in the adjacent compartment. This continues for each compartment to the end of coil form 19. The end of the secondary winding 18 is wrapped about post 38 and secured in place. Small strips of tape may be applied to keep the ends of the winding secure prior to soldering it to the appropriate terminal pin. The space 34a is bridged during the winding of the secondary 18. The space 34a underlies a focus take-off portion of the outer coil form 21. The space 34a thus maximizes the alignment of the two secondary windings 18 and 20 and minimizes voltage gradients and enhances overall uniformity.

Figure 9:
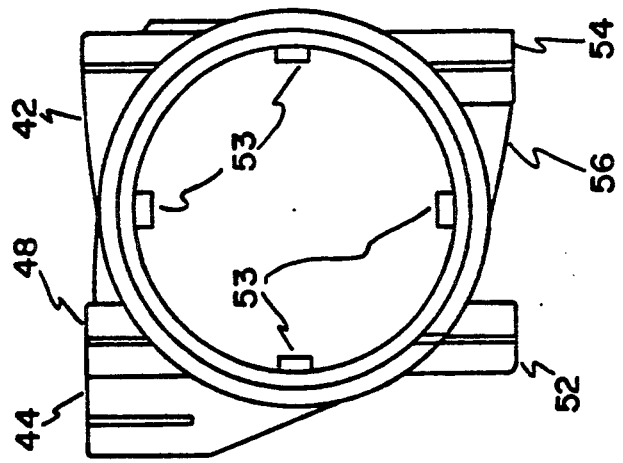
FIGS. 8 and 9 are respective end views of the coil form of FIG. 7.
Figure 7:
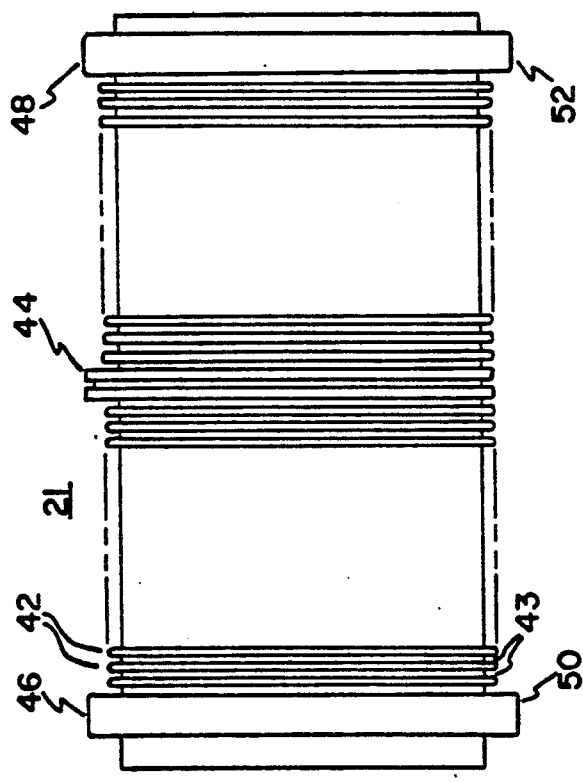
FIG. 7 is a side view of the outer secondary coil form constructed in accordance with the invention.
Figure 8:
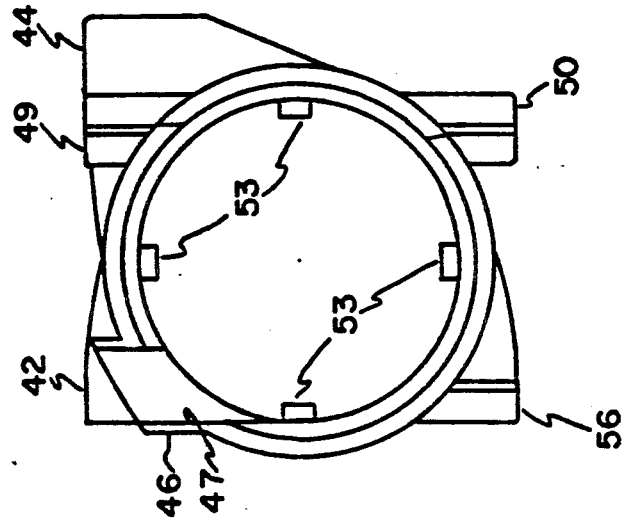

Referring to FIGS. 7, 8 and 9, the outside coil form 21 for the secondary winding is shown. Outside coil form 21 includes a number of terminal receiving protrusions 44, 46, 48, 50 and 52, each adapted to receive a terminal pin (not shown) for enabling mechanical and electrical connections. A similar plurality of circumferential walls 42 are provided with the same wall thickness and forming a plurality of compartments 43 along the surface of coil form 21. The depth of the compartments 43 is greater than that of compartments 35 in coil form 19, to enable flexibility in design of the secondary winding 20. In the preferred embodiment, secondary windings 18 and 20 are identical and the additional depth of compartments 43 is not needed. A centrally located terminal receiving protrusion 44 extends in the middle of the coil form 21 for enabling a center tap to be conveniently made to the middle of secondary winding 20. Since the winding 20 is connected to a diode at each end, a virtual AC ground or zero exists at this point and the DC voltage is one-half of the total DC output voltage. This DC voltage may be used as a focus voltage for the cathode ray tube. Suitable internal ridges 53 that taper from one end of coil form 21 to the other are formed for location purposes so that coil form 19 may be properly and securely positioned within coil form 21.

Referring specifically to FIG. 8, a generally U-shaped portion 46 forms a cutout 47 in which the terminal receiving protrusion 36 of coil form 19 nests. The arrangement not only fixes the relative positions of coil forms 19 and 21, but facilitates the complete overlapping of the secondary windings on the two coil forms. While not illustrated, the surface of coil form 21 includes a plurality of interruptions 40 formed in each of the walls 42 to permit windings in each compartment to exit the compartment 43 and enter the adjacent compartment 43.

In FIG. 10, a partial view of the nested coil forms 15, 19 and 21 is shown with the secondary windings 18 and 20 occupying their relative positions. In accordance with conventional winding techniques, the first secondary winding 18 is wound in one direction and the second secondary winding 20 is wound in the opposite direction to minimize capacitive coupling between the two windings. This is indicated by the start S1 and finish F1 of winding 18 and the start S2 and finish F2 of winding 20. It will be appreciated that extremely fine wire (#35) is used in the secondary windings and that the showing of the coil turns in the drawings is clearly not to scale. As is well known, small wire size makes manufacturing very difficult. The arrangement of the invention, with the wall portions forming individual compartments, has permitted the cross section of the secondary winding wire used in a production high voltage transformer to be increased from #45 to #35. This makes the wire much easier to handle, minimizing breakage and enables more efficient production. The use of only two secondary windings also permits the number of high voltage diodes to be reduced to three, whereas with layer wound transformers of the prior art, up to seven diodes were used. As mentioned, the low leakage inductance encountered has also permitted higher frequency operation of the transformer which yields further advantages in terms of its size and performance.

What is claimed is:

1. In a high voltage transformer of the type including a ferrite core magnetically linking a primary winding supported on a cylindrical coil form, a pair of secondary windings serially connected with diodes to develop a high DC voltage, a pair of secondary winding cylindrical coil forms nesting with said primary coil form, such that each secondary winding substantially overlies said primary winding, each of said secondary winding coil forms including a plurality of spaced circumferential walls forming individual compartments for supporting a multilayered group of coil turns therein and wherein said spaced circumferential walls include interruptions to permit said secondary windings to bridge adjacent compartments, the improvement comprising:
 a centrally disposed raised portion on said third outermost coil form supporting a connection post for tapping one of the secondary windings thereon to produce a DC focus voltage at virtual ground.

2. The transformer of claim 1 wherein each of said compartments contains substantially the same number of secondary coil turns.

3. A hybrid high voltage transformer comprising:
 a magnetic core;
 first, second and third cylindrical coil forms arranged in a nesting configuration on said magnetic core;
 a primary wound on said first coil form;
 a pair of secondaries would in opposite directions on said second and said third coil forms, respectively, with each of said pair of secondaries substantially overlying said primary;
 a high voltage diode connected between said pair of secondaries and to each remaining end of said pair of secondaries for developing an additive DC voltage thereacross;
 said second and said third coil forms each having a plurality of spaced circumferential walls forming a plurality of compartments, each capable of supporting a multilayered group of coil turns therein, said second and said third coil forms each including end protrusions for supporting connection posts and each including interruptions in said circumferential walls permitting a continuous winding to extend between adjacent ones of said compartments; and said third coil form being outermost and including a centrally disposed raised portion supporting a connection post for tapping one of said secondaries thereon to produce a DC focus voltage at virtual ground.

4. The transformer of claim 3 wherein each of said compartments contains substantially the same number of secondary coil turns.

* * * * *